US006285090B1

(12) United States Patent
Brutsaert et al.

(10) Patent No.: US 6,285,090 B1
(45) Date of Patent: Sep. 4, 2001

(54) LOW-SPEED DIRECTLY DRIVEN WIND TURBINE

(75) Inventors: Patrick Brutsaert, Recquignies; Jean-Marc Canini, Aibes; Raymond Michaux, Solre le Chateau, all of (FR)

(73) Assignee: Jeumont Industrie, Courbevoie (FR)

( * ) Notice: Subject to any disclaimer, the term of this patent is extended or adjusted under 35 U.S.C. 154(b) by 0 days.

(21) Appl. No.: 09/367,010

(22) PCT Filed: Mar. 9, 1998

(86) PCT No.: PCT/FR98/00468

§ 371 Date: Nov. 8, 1999

§ 102(e) Date: Nov. 8, 1999

(87) PCT Pub. No.: WO98/40627

PCT Pub. Date: Sep. 17, 1998

(30) Foreign Application Priority Data

Mar. 10, 1997 (FR) .................................................. 97 02808

(51) Int. Cl.[7] .................................................... F03D 9/00
(52) U.S. Cl. ................................ 290/55; 290/44; 310/216
(58) Field of Search ................................. 290/43, 44, 52, 290/54, 55; 310/216

(56) References Cited

U.S. PATENT DOCUMENTS

| 4,075,500 | * | 2/1978 | Oman et al. | 290/55 |
| 4,140,433 | * | 2/1979 | Eckel | 415/2 |
| 4,686,376 | * | 8/1987 | Retz | 290/42 |
| 5,986,378 | * | 11/1999 | Caamano | 310/216 |

FOREIGN PATENT DOCUMENTS

| 902092 | 7/1985 | (BE) . |
| 2623233 | 5/1976 | (DE) . |
| 2709146 | 3/1977 | (DE) . |
| 4402184 | 1/1994 | (DE) . |
| 0017724 | 2/1980 | (EP) . |
| 2551142 | 3/1985 | (FR) . |
| 2742939 | 6/1997 | (FR) . |
| WO9105953 | 5/1991 | (WO) . |
| WO9422204 | 9/1994 | (WO) . |

OTHER PUBLICATIONS

Chen et al., "A Variable–Speed, Permanent–Magnet, Wind–Turbine Generator And Its Control", Power Engineering Conference, vol. 2, Sep. 1995, pp. 517–520.

Jefferson et al., "The Application Of Flywheels In Short–Term Energy Storage", Alternative Energy Systems, Electrical Integration and Utilization Conference, Sep. 1984, pp. 97–104.

* cited by examiner

Primary Examiner—Nicholas Ponomarenko
(74) Attorney, Agent, or Firm—Leydig, Voit & Mayer, Ltd.

(57) ABSTRACT

An electrical energy production system includes a wind turbine having blades mounted on a support and which rotationally drive an alternator. The alternator includes at least one module having at least one rotor disk and one stator disk centered on an axis of the support and all of the rotor and stator disks are coaxial.

17 Claims, 6 Drawing Sheets

LOW-SPEED DIRECTLY DRIVEN WIND TURBINE

The present invention is in the area of wind turbine power production.

It concerns a system for the production concerns electrical energy activated by the force of the wind on the blades of a wind turbine.

BACKGROUND

Different types of wind turbines having an essentially vertical shaft and an essentially horizontal axis or even an essentially vertical axis are known.

The demand for energy increases constantly as fossil fuel reserves diminish.

This is why electrical companies are beginning to integrate wind turbine energy with other conventional energy sources. Thus, numerous wind turbine power stations have been installed.

Most wind turbines designed for energy production include a rapid asynchronous generator coupled to a multiplier, itself driven by the hub on which the wind turbine blades are mounted. Mention may be made especially of Micon wind turbines.

For example, a 1500-rpm asynchronous generator and a multiplier driven at a speed of 27 rpm correspond to 600 kW.

All these elements are placed in a nacelle, rotationally mounted to one end of the shaft. The height of the shaft is generally between 30 and 60 m.

Also within the nacelle is a nacelle orientation control system and, in some cases, a blade angle of attack control system. This allows the blades to be oriented as a function of the wind. In particular, if the wind becomes too strong, the pitch relative to the wind is modified for reasons of exploitation and safety.

These systems, such as the multiplier, require the presence of at least one hydraulic generator in the nacelle.

A global wind turbine control system is generally provided. It uses a controller that may control the blade angle of attack, the nacelle position, and/or the coupling of the generator to the supply network.

As the asynchronous generator has one or two fixed speeds, its operation on the supply network is not optimal over the entire range of wind speeds.

Low-speed directly driven wind turbines have also been installed. Of note are those manufactured by Enercon. They include a large-diameter radial-flux synchronous machine. The rotor disc of the machine is driven by a shaft, which, in turn, is driven by the wind turbine blades.

The synchronous machine feeds the supply network through an ac-dc-ac converter. Such a converter allows the supply network to be fed at the appropriate frequency and voltage.

In such wind turbines, all the control systems are electrical, especially those that ensure blade pitch or nacelle orientation, as well as the braking system.

These wind turbines allow dispensing with the multiplier and the hydraulic generator. They can also deliver power even at low wind speed.

However, they include an air-cooling system that generates a significant noise level.

In addition, the presence of rotor field windings implies excitation losses that become appreciable at low wind speeds, significantly diminishing the efficiency of the assembly.

Finally, the power of the synchronous machine is necessarily limited by the diameter of the rotor.

Excitation of such a machine with a wound rotor implies either the use of a set of slip rings and brushes, constraint of maintenance generators, or the inclusion of an auxiliary ac exciter and a set of shaft-mounted rectifiers, which further increase the mass of the assembly.

It may be noted also that, in general, wind turbine assembly is difficult. It requires very tall cranes able to lift heavy members of great bulk. Thus, assembly requires a significant engineering effort. For that reason, assembly of such wind turbines in countries that do not have the appropriate equipment at their disposal is not possible.

SUMMARY OF THE INVENTION

The object of the invention is the provision of a system for the production of energy associated with a wind turbine that does not require a multiplier, while facilitating construction of the wind turbine and reducing the noise generated by the wind turbine during operation.

This system for the production of electrical energy is associated with a wind turbine comprising blades fixed on a support and driving in rotation the rotor of an alternator.

This alternator is of the discoid type and consists of at least one module comprising at least a rotor disk and a stator disk centered on the axis of the blade support, the modules being assembled in such a way that all the rotor and stator disks are coaxially arranged.

The direct driving of the rotor disk(s) by the wind turbine blades renders the presence of a multiplier unnecessary and possibly permits the complete discontinuance of the hydraulic generator.

In addition, the modular design of the alternator allows for easy adaptation to system power.

The following characteristics may likewise be taken into account, individually or according to all technically possible combinations:

the system includes a shaft driven in rotation by the blade support, the rotor disk(s) being integrated with said shaft, the blade support includes the alternator frame, which includes the alternator rotor disk(s), a module has a rotor disk arranged, between two stator disks or a stator disk between two rotor disks, the rotor disk or disks have permanent magnets, the stator disks are affixed to the wind turbine nacelle, an ac(-dc)-ac converter is placed between the alternator and the supply network, the ac(-dc)-ac converter consists of a rectifier and an inverter, both controlled by pulse-width modulation, the wind turbine includes a system for global control of the operating parameters.

The invention also concerns a wind turbine equipped with an energy production system in accordance with the invention and in which certain parts, especially the blades, their support, the discoid alternator, and/or the nacelle are manufactured separately and are finally assembled at the top of the wind turbine shaft.

The invention also concerns an array of wind turbines each equipped with a system for the production of electrical energy according to the invention and an ac-dc converter.

The output of each of these converters is connected to at least one dc-ac converter and the common-node output of the dc-ac converters is connected to the supply network.

The following characteristics also may be taken into account, individually or according to all their technically possible combinations:

- the wind turbine array includes an energy storage system between the dc-ac converters and the supply network,
- the wind turbine array includes at least one kinetic energy storage system, supplied by the dc voltage tapped at the output of the ac-dc converter(s),
- the kinetic storage system(s) include(s) at least one ac motor driving at least one inertial load and powered by at least one reversible dc-ac converter, which, in turn, is connected to the output of the ac-dc converter(s),
- the ac-dc converters include of a rectifier controlled by pulse-width modulation, and
- the dc-ac converters include of an inverter controlled by the principle of pulse-width modulation.

BRIEF DESCRIPTION OF THE DRAWINGS

The invention will be better understood and other uses, advantages, and characteristics of the invention will become clearer upon reading the following description of the non-limiting modes of realization, wherein.

DETAILED DESCRIPTION OF PREFERRED EMBODIMENTS

Elements common to the different figures are designated by the same reference numbers.

Figures 1, 2:
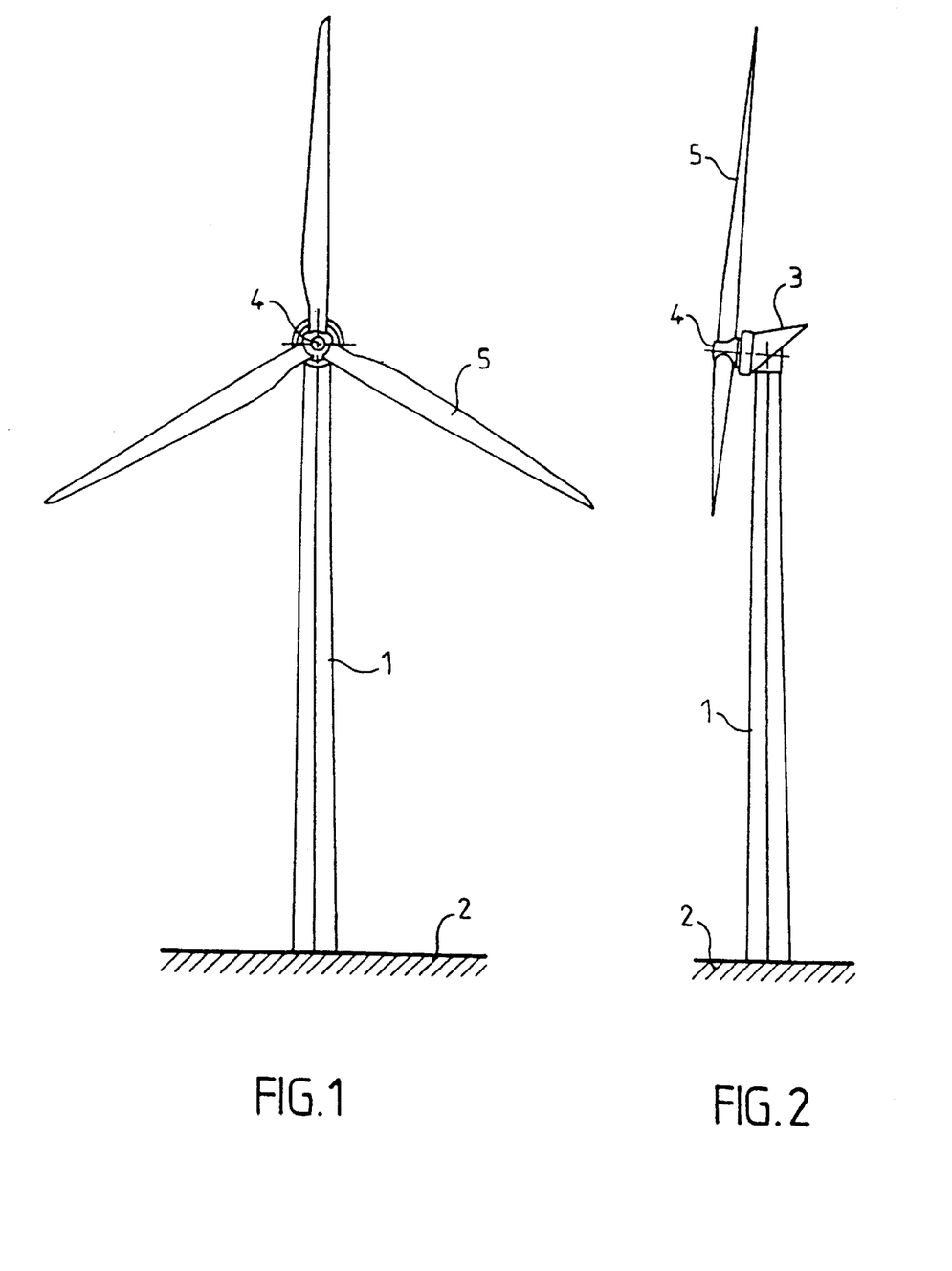
FIG. 1 is a front view of a wind turbine.
FIG. 2 is a side view of the same wind turbine.

With reference to FIGS. 1 and 2, the wind turbine generally includes a mast 1 fixed in the ground 2.

At the end of the mast there is a nacelle 3 which turns about the mast.

The nacelle holds a hub 4, which, in turn, supports the blades 5. They are driven in rotation by the wind.

Figure 3:
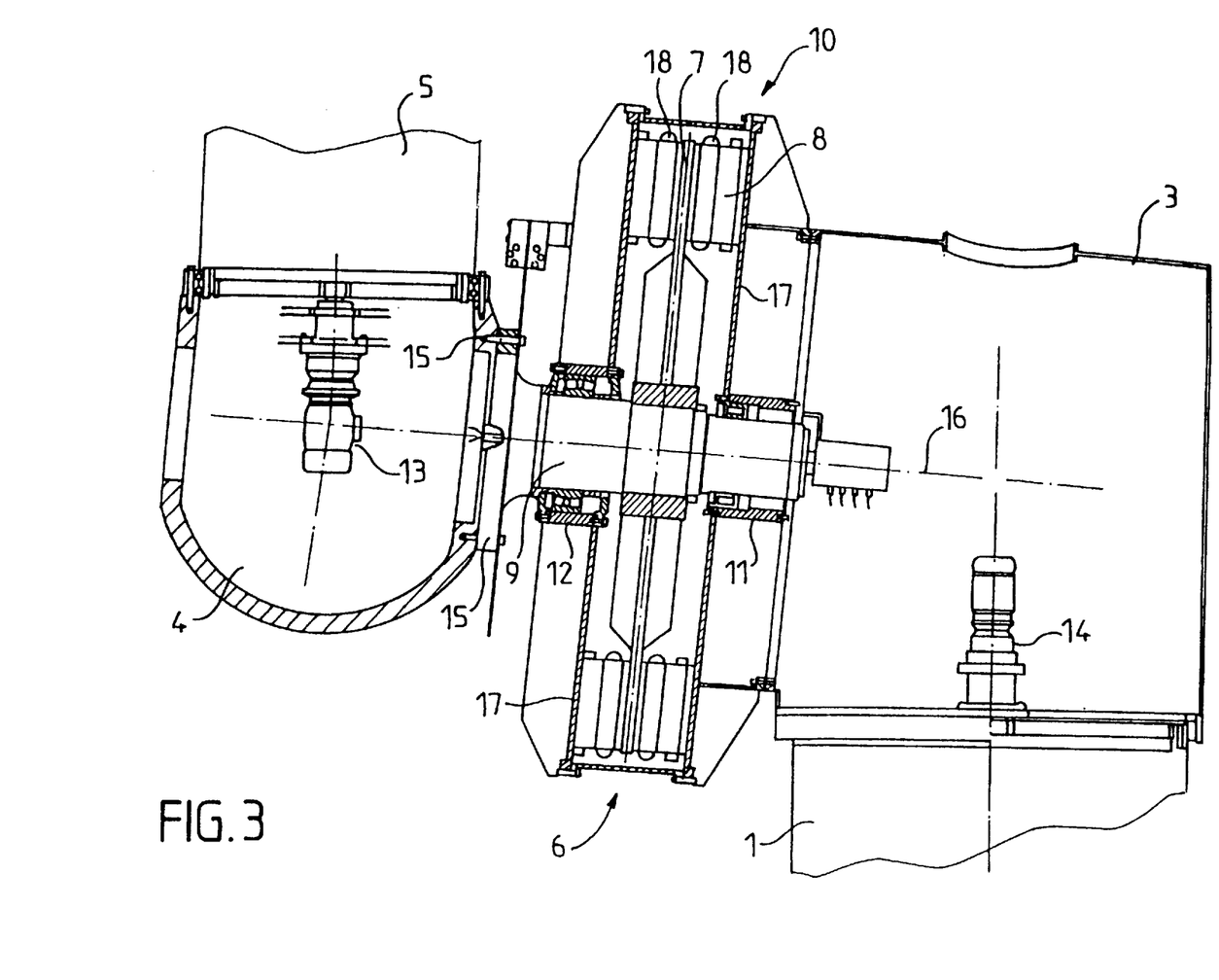
FIG. 3 is a schematic cross section of a first example of an energy production system in accordance with the invention.

With reference to FIG. 3, the energy production system in accordance with the invention includes a discoid alternator 6 including of one or more modules.

In the example illustrated in FIG. 3, the alternator consists of a module 10 that includes a central rotor 7 and two stators 8 sandwiching the rotor.

The rotor 7, equipped with permanent magnets, is mounted on a shaft 9 and centered on the axis 16 of the shaft 9. The shaft 9, in turn, is connected to the hub 4 by appropriate means 15.

The use of a rotor with permanent magnets has the advantage of further reducing the bulk of the discoid alternator 6, which is already smaller than a conventional generator. As will be seen later, this facilitates transport of the generator and its placement in the wind turbine.

In this embodiment, the blade support consists of the hub 4. The axis of the hub coincides with the axis 16 of the shaft 9 and of the central rotor 7.

The shaft 9 is supported and guided by bearings 11 and 12 mounted in the nacelle 3.

The stators 8 are also mounted in fixed fashion in the nacelle, by means of the frame elements 17 integrated with the bearings 11 and 12.

The stators 8 are equipped with windings 18.

The rotation of the blades 5 drives the hub 4, the shaft 9, and thus the rotor 7 of the discoid alternator. The latter is thus directly coupled to the hub 4 of the wind turbine and is capable of operating at variable speeds.

Reference number 13 designates a pitch adjustment system for the blades 5 and reference number 14 designates system for orienting the nacelle 3.

Figure 4:
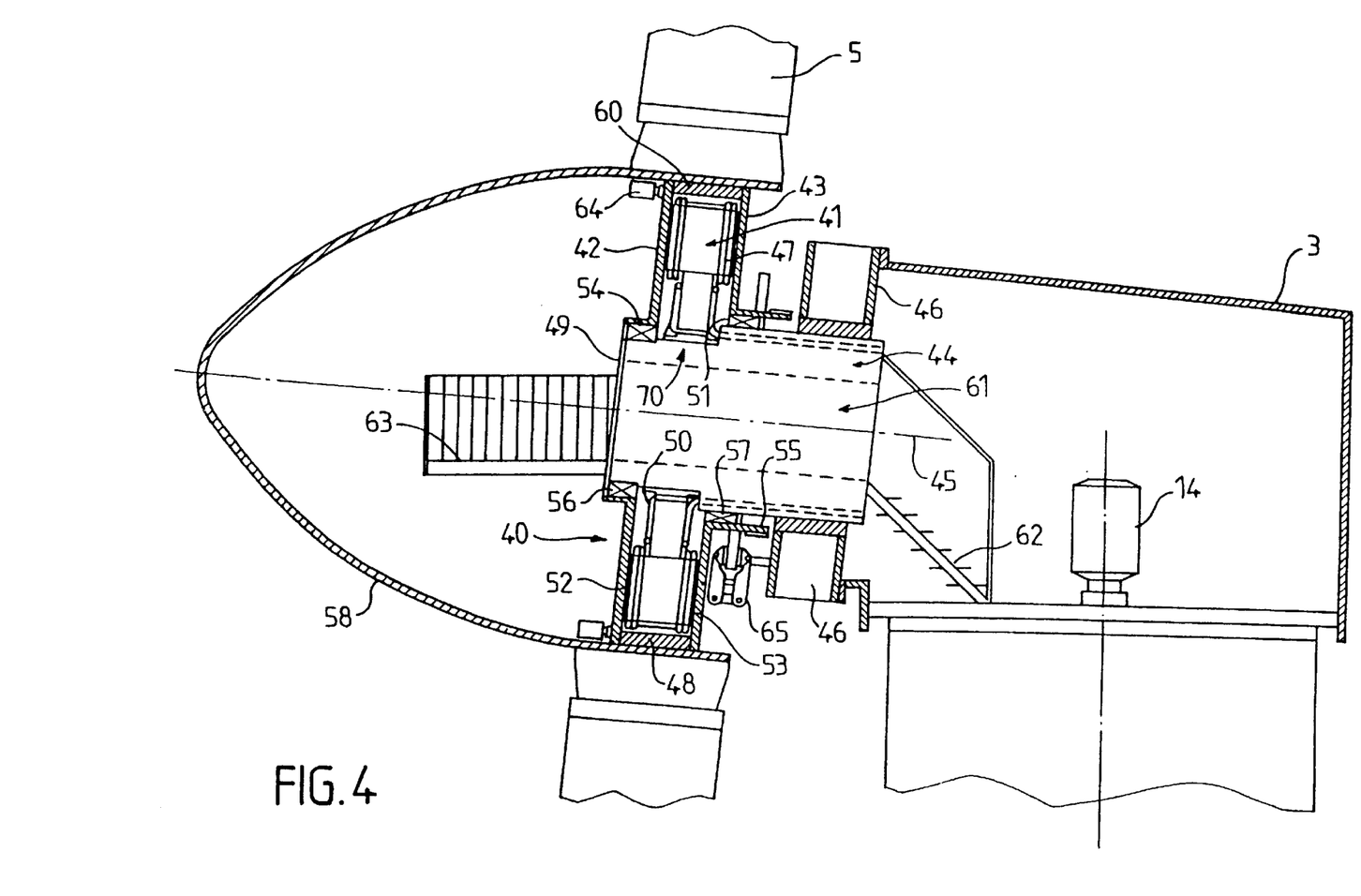
FIG. 4 is a schematic cross section of a second example of an energy production system in accordance with the invention.

FIG. 4 describes another embodiment example of the energy production system in accordance with the invention, in which the blades 5 of the wind turbine are mounted directly to the alternator of the system.

This alternator 40 is also of the discoid type and can include one module, as illustrated in FIG. 4, or several modules.

The alternator 40 here includes a module 70 consisting of a central stator 41 and two rotors 42, 43 sandwiching the stator 41.

The stator disk 41 is integrated with a fixed shaft 44 and centered on the axis 45 of the haft 44. The latter is, in addition, integrated with the nacelle 3 using appropriate means 46.

On each face, the stator disk 41 carries windings 47.

The rotor disks 42 and 43 are integrated with the alternator frame 60. They are equipped with permanent magnets 52 and 53.

Each rotor disk 42, 43 also includes a flange 54, 55 allowing it to be centered on the axis 45 of the shaft 44, by means of ball bearings 56, 57.

At the end of the shaft 44 there is a cover 49 that prevents the introduction of foreign matter into the ball bearing 56.

The frame 60 of the alternator 40 consists of the rotor disks 42, 43 and a cylindrical part 48 between the two disks.

Thus, the wind turbine blades 5 are mounted to the frame 60 of the alternator. In the example illustrated in FIG. 4, this mounting is carried out by a structure 58 that supports the blades 5.

In this embodiment, the blade support consists of the alternator frame and axis of the support coincides with the axis 45 of the rotor disks and of the shaft 44.

The wind turbine blades thus directly drive the rotor disks 42 and 43 of the alternator 40 in rotation, without the need of an intermediate shaft, as in the embodiment example illustrated in FIG. 3.

Still with reference to FIG. 4, reference number 61 designates a hollow in the shaft 44. This hollow allows passage to a person who can reach it by means of a ladder 62 provided in the nacelle. The hollow 61 opens onto a walkway 63.

It allows for access for maintenance of the equipment located within the structure 58, and especially of the motors 64 of the system for adjusting the blade pitch, which may be provided.

Finally, reference number 65 designates a mechanical brake.

In each case, the energy production system according to the invention is designed such that the alternator operates at the same rotational speed as the blade support of the wind turbine. This allows certain components to be eliminated, such as the multiplier, which is one of the great consumers of a hydraulic generator. It is thus possible to consider completely eliminating the hydraulic generator(s), whether provided for lubrication or control purposes. All the auxiliary elements, such as the possible controller for the blade angle of attack or the positioning of the nacelle to face the wind, are designed with electric motors.

Moreover, the power of the system can be increased without affecting the design of the wind turbine, making the system highly flexible.

Indeed, the number of alternator rotor/stator modules 10, 70 may be chosen as a function of the desired power. These modules are stacked one behind the other, limiting the bulk. The rotor in each module is centered and directly mounted on shaft 9 or 44, and all the modules are mechanically assembled so that all the rotor and stator disks are arranged coaxially.

In this regard, one may refer especially to International Patent Application No. PCT/FR 96/020 71 which describes a discoid electrical machine realized on the basis of elementary stator/rotor modules and whose contents are included in the present application for reference purposes.

The diameter of the nacelle may be preserved.

Nevertheless, the multiplication of alternator modules is especially justified for power exceeding 1000 kW.

The following table is given as an example:

| Number of modules | Power |
|---|---|
| 1 | 750 kW |
| 2 | 1250 kW |
| 3 | 1630 kW |

Other modules may be proposed for power above 2 MW.

The energy production system according to the invention proves equally advantageous for low-power wind turbines, as it allows in that case as well the elimination of the multiplier.

The energy production system according to the invention also allows for simplification of wind turbine manufacture and at reduced cost.

In known wind turbines, the constituent elements of the wind turbine form a specific assembly that must be hoisted to the top of the mast.

With the system in accordance with the invention, the wind turbine may be manufactured in several discrete components: especially the mast, the blades, the nacelle and orientation device, and the discoid generator, which, in turn, is composed of discrete modules.

The elements can thus be assembled one after the other in a simple manner, as the mass and bulk of each element is small. The discoid generator is especially more compact than conventional generators.

For a high-power energy production system, the different modules of the discoid alternator may be mounted successively. The assembly may thus be carried out with the aid of a low-capacity crane having a relatively light structure, not requiring significant engineering.

Assembly of the wind turbine may also be carried out by a crane mounted on the upper part of the mast. It allows for carrying in succession the different components, such as the nacelle or the alternator. This crane is either disassembled and taken down or integrated into the wind turbine.

Thus, in all cases, at least some of the components of the wind turbine may be manufactured and lifted separately, the final assembly taking place at the top of the wind turbine mast.

In addition, the compact form of the discoid alternator allows the form of the nacelle and thus its manufacture to be simplified. It can have an essentially cylindrical shape.

Finally, the energy production system according to the invention allows the air noise level of the wind turbine to be reduced.

Indeed, the latter is completely closed and also may be equipped with cooling circuits. Thus, there is no air propagation of the internal noise of the wind turbine to the outside.

In addition, the system according to the invention includes a discoid alternator possessing a large mass and output power.

Compared with other types of generators of identical volume, mass and power, it allows an increase of coupling to the rotor disk(s) and thus a decrease of the shaft line rotation speed. This leads to a reduction of the noise generated by the wind turbine blades.

Moreover, the discoid alternator according to the invention presents a smaller section to the wind than does the directly driven radial field alternator for the same power. This is reinforced by the modular structure of the alternator. Consequently, it assures improved aerodynamic conditions for the wind turbine blades, the "useful" surface of the blades being more significant.

Between the discoid alternator and the network, there must be an ac-ac converter or an ac-dc-ac converter.

Preferably a high-performance converter is chosen which allows for progressive coupling of the wind turbine to the supply network. In current wind turbines with asynchronous generators, this coupling is rapid, causing disruptions to the supply network.

In addition, the supply network can send remote control signals. For example, there are 175 Hz signals for controlling rate changes (night/day), peak-day blackouts, etc. Certain types of wind turbines need a bandstop filter in order not to disturb remote control signals.

The converter has the advantage of not disturbing any supply network remote control signals, much less regenerating them.

The use of a converter allows the power factor to be controlled and thus the reactive power is absorbed or supplied to the network.

In addition, the end current control allows the harmonics of the supplied current to be reduced, thus providing high-quality energy to the network.

Preferably the converter consists of two power stages:
  a rectifier which has "pulse-width modulation" control and which transforms the ac supplied by the alternator to dc. The control of the rectifier bridge allows for control of the current waveforms supplied by the alternator and the power factor. This allows, on the one hand, for reduction of coupling pulses and thus mechanical constraints on the rotor and, on the other hand, minimization of the magnet mass and thus the alternator cost,
  an inverter whose control is also of the pulse-width modulation type and which transforms dc into ac of a form and frequency compatible with the supply network. Thanks to the inverter bridge control strategy, current harmonic levels are minimized and the power factor is controlled.

Use of an alternator with magnets connected to an IGBT (insulated gate bipolar transistor) converter has the advantage of increased protection against short circuits, especially if the converter is placed in proximity to the alternator in the nacelle.

The use of converters is particularly interesting in isolated networks where the quality of the current generated by the wind turbine is of critical importance.

The energy production system according to the invention can function at varying speeds. This allows wind turbine functioning to be optimized, especially with weak winds.

The wind turbines may be placed in different environments. Optimal wind turbine functioning parameters depend not only on the wind but also on parameters linked to the wind turbine environment, such as the presence of buildings or wind orientation.

Preferably the wind turbine includes an overall control system. Advantageously, this system uses fuzzy logic or neural network software. It allows optimization of wind turbine operation by learning and permanent adaptation to operating parameters, especially at low-speeds.

In this case, the control has a possible effect on blade pitch and on the choice of optimal speed.

When several wind turbines are installed at the same site, their energy production systems may be interconnected by a dc power network.

As previously noted, each wind turbine is provided an ac-ac converter or an ac-dc-ac converter between the discoid alternator and the supply network.

FIGS. 5, 6, 7, and 8 refer to and represent different assembly solutions.

Figure 5:
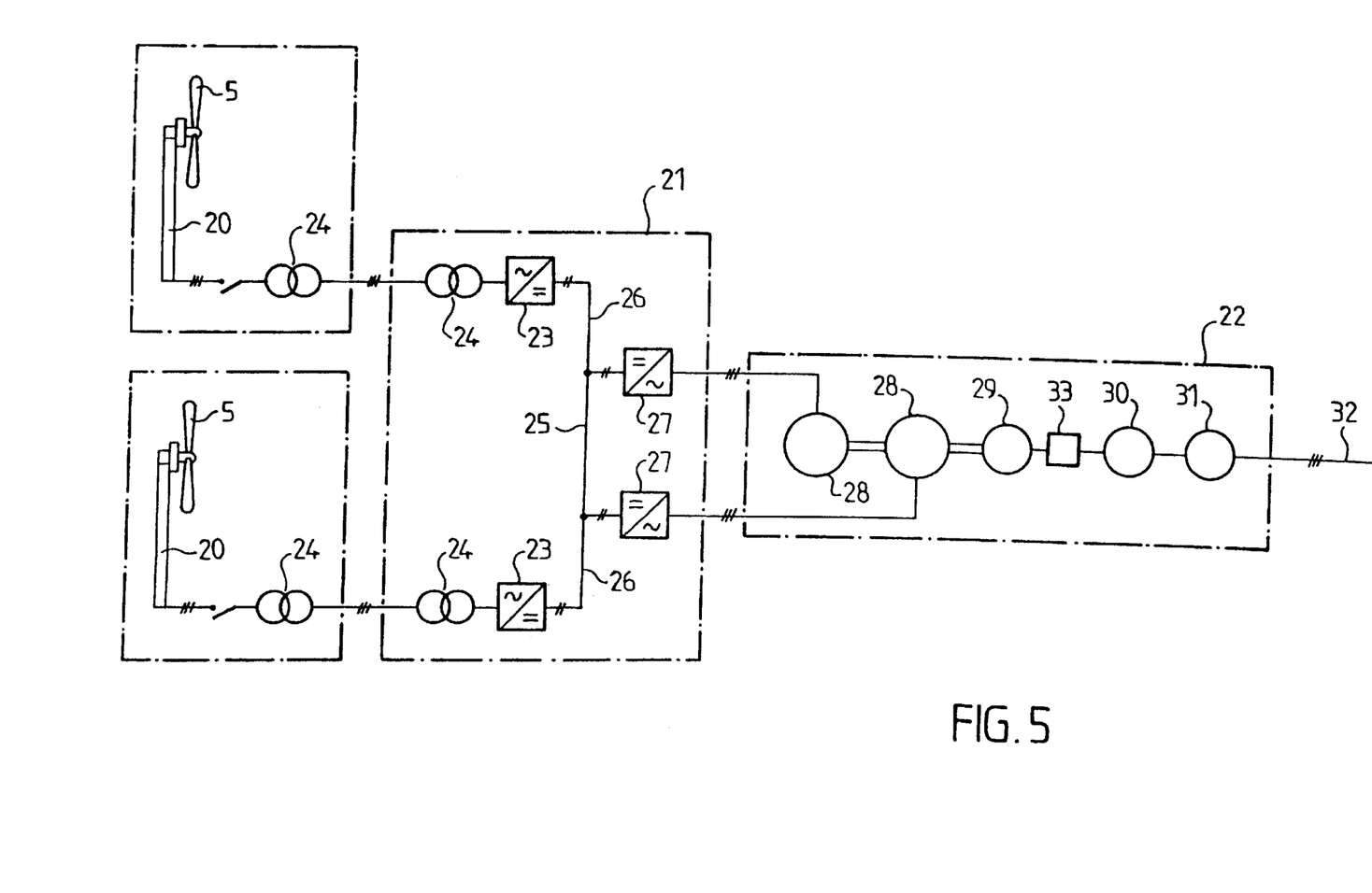
FIGS. 5 and 6 illustrate two examples of connection of a wind turbine array to the electrical supply network.

The system illustrated in FIG. 5 is a wind turbine station consisting of two wind turbines 20 equipped with an energy production system according to the invention, a set of electronic converters 21, and an energy storage system 22. The last system is optional.

FIG. 5 illustrates two wind turbines and two converters; however, this assembly may be applied to any number of wind turbines, each associated with a converter.

Each wind turbine 20 includes a discoid alternator, particularly having permanent magnets, directly driven by and at the same rotation speed as the wind turbine blades 5. The alternator output is three-phase, at possibly variable frequency and voltage following the wind velocity. It is connected to the outside through a protection component and possibly a transformer to step up the voltage.

The set of electronic converters 21 includes:
- two rectifier converters 23, each connected to a wind turbine through a possible transformer 24 to step down the alternating voltage. The rectifier converts ac energy to dc energy,
- a dc power bus 25 connected to the set of outputs 26 of the rectifiers 23 and which allows the total energy provided by the wind turbine generator to be smoothed out. The dc bus voltage may be variable,
- electronic converters 27 of the inverter type which are fed by the dc bus 25 and which are connected to the energy storage system 22.

The latter consists primarily of:
- at input, an auxiliary 29 driven by at least one drive motor 28, fed at controlled speed and possibly at variable speed by the converters 27,
- at output, an auxiliary 30 which drives an alternator 31 which feeds the electrical supply network 32 at the appropriate voltage and frequency, and
- a device 33 placed between the two auxiliaries 29 and 30, which allows energy to be stored or discharged so that output alternator 30 can always operate under the conditions required for the electrical supply network 32. The storage device 33 may be of any type: hydraulic, gas compression, battery, or any other system.

The object of the system is to recoup maximum energy from the wind and to store it or discharge it according to the needs of the electrical supply network.

The assembly in FIG. 5 has two advantages.

It leads first of all to a smoothing out of the total power provided by the wind turbines 20 which is effected naturally in the dc network.

In addition, a breakdown of a dc-ac converter 23 does not lead to stopping of the wind turbine.

In summary, this assembly allows the use of standardized modules for the dc-ac converters 23. The base module, for example, is a single 1 MVA module.

As previously indicated, the energy storage system 22 may be omitted. In that case, the dc-ac converter outputs are connected in parallel to the network 32, possibly via a transformer.

Figure 6:
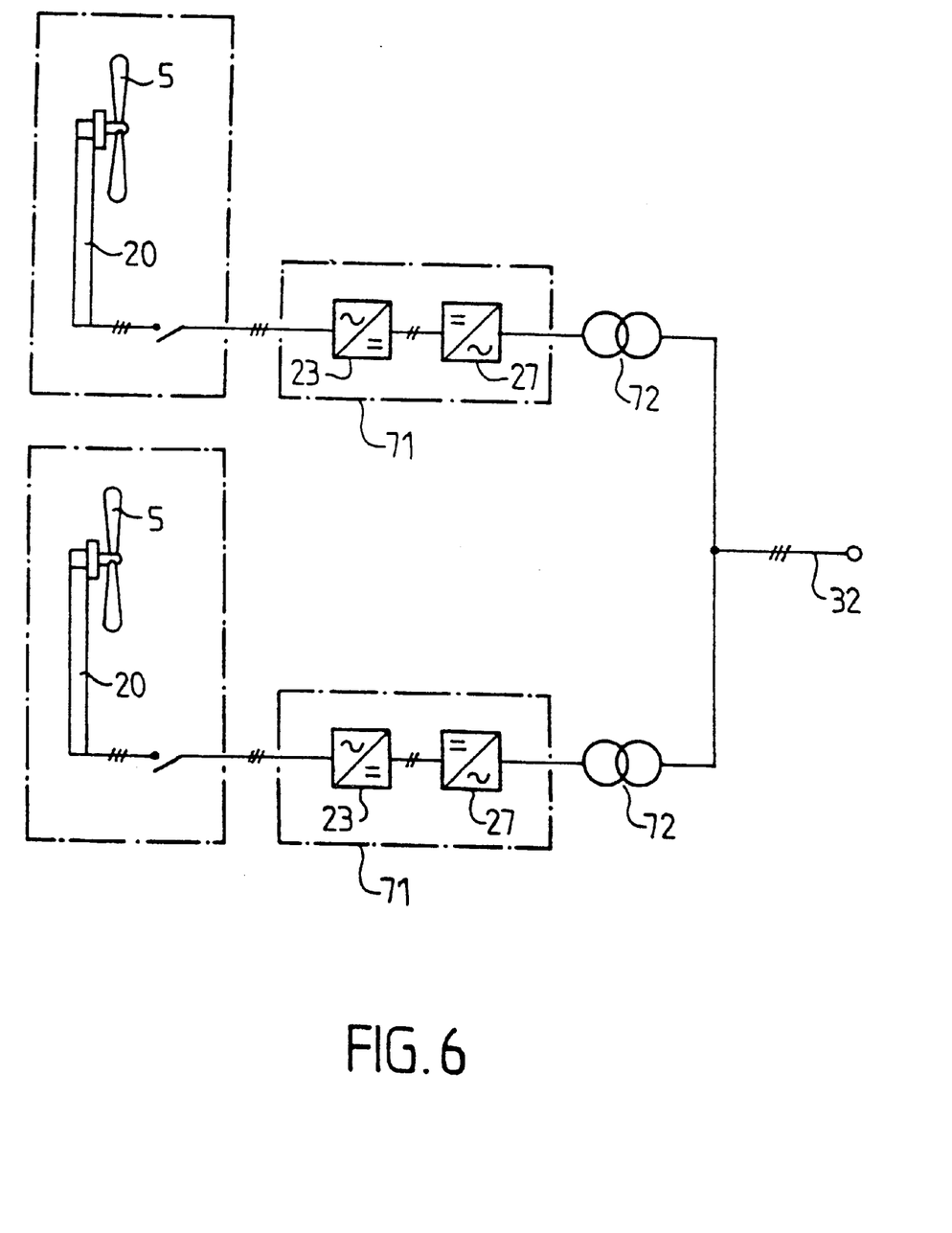

It is possible to envision as well the different assembly illustrated in FIG. 6.

In this other assembly, each wind turbine 20 is equipped with an ac-dc-ac converter 71 and possibly an elevating transformer 72 at the output. The interconnection of wind turbines is then made at the level of ac network 32. It is also possible to provide a transformer between the parallel-connected outputs of the converters 71 and the network 32.

The converter 71 includes one ac-dc converter 23 and one dc-ac converter 27.

Figure 7:
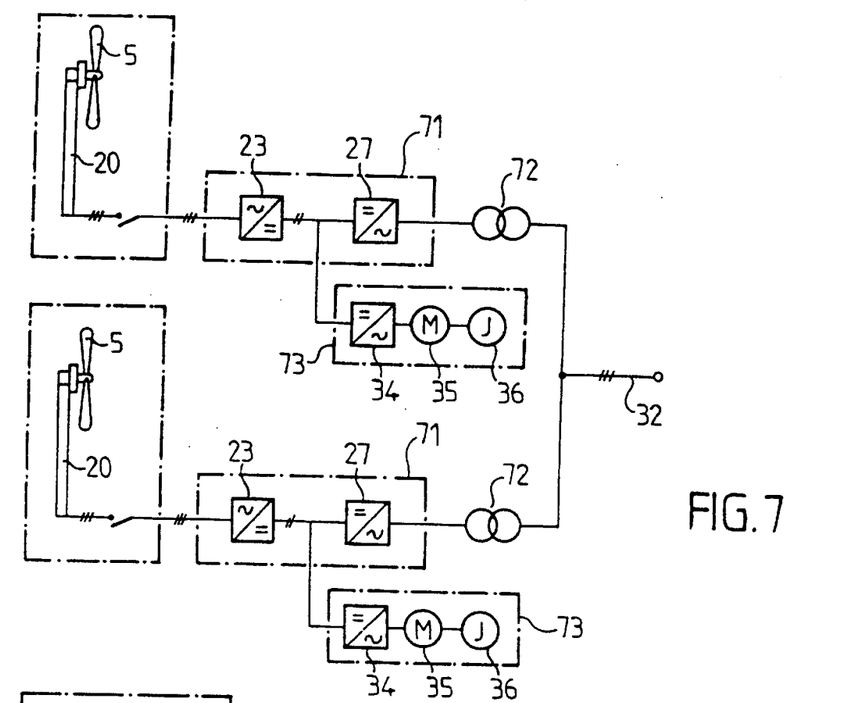
FIGS. 7 and 8 illustrate two additional examples of connection of a wind turbine array to the electrical supply network that includes a kinetic energy storage system.
Figure 8:
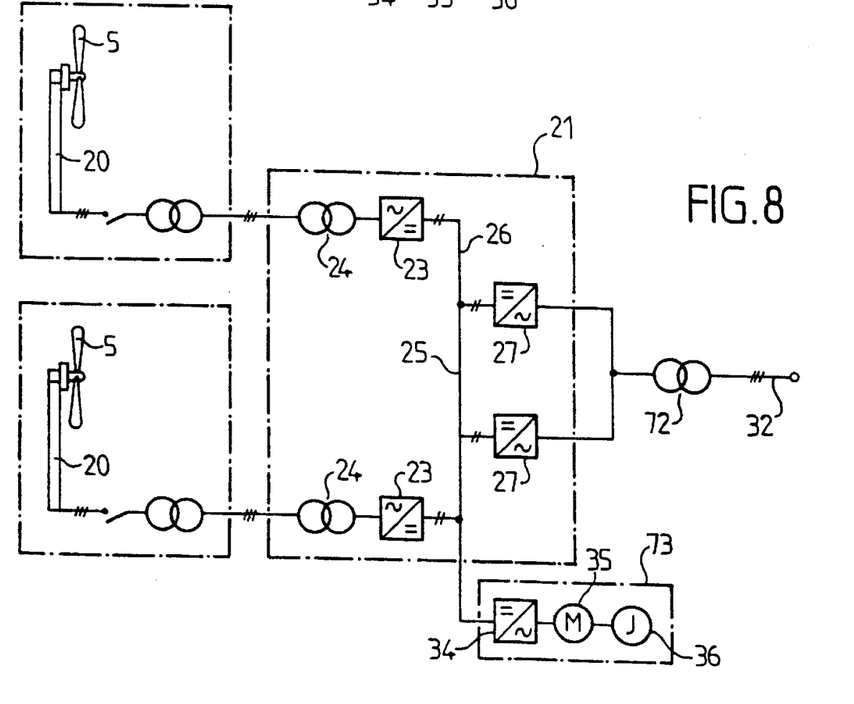

It is also possible to provide other assemblies in which there is at least one energy storing system, as illustrated in FIGS. 7 and 8.

FIG. 7 illustrates an assembly similar to that of FIG. 6; the kinetic energy storage system 73 is connected between the ac-dc converter 23 and the dc-ac converter 27. It is sourced by tapping off the power from the dc network between these two converters and allows the energy provided by the wind turbine(s) to be stored or discharged.

The storage system 73 consists of at least one reversible dc-ac converter 34 supplying at least one ac motor 35 that drives at least one high value inertial load 36.

This system allows the energy provided to the network 32 to be smoothed by storing in the form of kinetic energy and releasing the power and energy fluctuations provided by the wind turbines.

FIG. 8 illustrates an assembly similar to that of FIG. 5, in which the energy storage system 22 is omitted and a kinetic energy storage system 73 is provided.

This system 73 is connected between the ac-dc converters 23 and the dc-ac converters 27.

The dc-ac converter 27 outputs are connected parallel to the network 32, possibly via a transformer 72.

The energy production system according to the invention applies to all types of wind turbines, especially those with an essentially horizontal axis or an essentially vertical axis.

In addition, the previously described converters can be placed between an alternator of any type associated with a wind turbine and the supply network. In other words, these converters may be used equally to connect to the supply network a wind turbine with an alternator not necessarily of the discoid type.

Additionally, the assemblies described with reference to FIGS. 5 and 8 may be used for wind turbines equipped with energy production systems other than those that are in conformity with the invention. In particular, these converter and optional energy storage system assemblies may be used with wind turbines that are not associated with a discoid alternator, but rather, for example, an asynchronous generator.

What is claimed is:

1. An electrical energy production system comprising:
   a wind turbine including blades mounted on a support; and
   a discoid alternator, the blades rotationally driving the discoid alternator, wherein the discoid alternator includes at least one module having
      at least one rotor disk coupled to the blades, and
      at least one stator disk centered on an axis of the support, wherein all of the rotor and stator disks are coaxial.

2. The energy production system in accordance with claim 1, including one module having a rotor disk located between two stator disks.

3. The energy production system in accordance with claim 1, including one module having a stator disk located between two rotor disks.

4. The energy production system in accordance with claim 1, wherein the rotor disk has permanent magnets.

5. The energy production system in accordance with claim 1, wherein the wind turbine has a nacelle and the stator disks are mounted on the wind turbine nacelle.

6. The energy production system in accordance with claim 1, including an ac-(dc-)ac converter connected between the alternator and a supply network.

7. The energy production system in accordance with claim 6, wherein the converter includes a pulse width modulated rectifier and inverter.

8. The energy production system in accordance with claim 1, wherein the wind turbine includes a global operating parameter control system.

9. The energy production system in accordance with claim 1, wherein the blades, the support, and the discoid alternator are manufactured separately and undergo final assembly on a wind turbine mast.

10. A wind turbine array including a plurality of energy production systems in accordance with claim 1, an ac-dc converter, a dc-ac converter connected to the ac-dc converter, the dc-ac converter being connected to a network.

11. The wind turbine array in accordance with claim 10, including an energy storing system connected between the dc-ac converter and the network.

12. The wind turbine array in accordance with claim 10, including at least one kinetic energy storage system, fed by a dc voltage taken at an output of the ac-dc converter.

13. The wind turbine array in accordance with claim 12, in which the kinetic energy storage system includes at least one motor which drives at least one inertial load and is fed by at least one reversible dc-ac converter, which, in turn, is connected to an output of the ac-dc converter.

14. The wind turbine array in accordance with claim 10, wherein the ac-dc converter includes a pulse width modulated rectifier.

15. The wind turbine array in accordance with claim 10, wherein the dc-ac converter includes a pulse width modulated inverter.

16. An electrical energy production system comprising:
   a wind turbine including blades mounted on a support;
   a discoid alternator, the blades rotationally driving the discoid alternator, wherein the discoid alternator includes at least one module having
      at least one rotor disk coupled to the blades,
      at least one stator disk centered on an axis of the support, wherein all of the rotor and stator disks are coaxial; and
   a shaft rotationally driven by the blades, the rotor disk being integrated into the shaft.

17. An electrical energy production system comprising:
   a wind turbine including blades mounted on a support;
   a discoid alternator, the blades rotationally driving the discoid alternator wherein the discoid alternator includes at least one module having
      at least one rotor disk coupled to the blades, and
      at least one stator disk centered on an axis of the support, wherein all of the rotor and stator disks are coaxial and the support includes a frame of the alternator, which covers the alternator rotor disk.

* * * * *